United States Patent Office 3,437,810
Patented Apr. 8, 1969

3,437,810
NON-DESTRUCTIVE TUBULAR GOODS INSPECTION APPARATUS
Fenton M. Wood, Sugarland, William T. Walters, Philip A. Rogers, and Noel B. Proctor, Houston, Tex., assignors to American Machine and Foundry Company, New York, N.Y., a corporation of New Jersey
Filed Feb. 26, 1964, Ser. No. 347,506
Int. Cl. G01t 1/16, 1/20; C01r 33/12
U.S. Cl. 250—83.3          25 Claims This invention relates to a novel nondestructive testing apparatus utilizing novel nondestructive testing units therein. More particularly, the invention relates to a plurality of novel nondestructive testing units included in one novel tool whereby a more definitive inspection can be made for a plurality of different types of defects in one operation.

Tubular goods such as pipe used in the petroleum and petrochemical industries are characterized by having a plurality of different types of defects such as pits, cracks (both longitudinal and transverse), holes, thin walls, structure change in the metal and the like. The apparatus of this invention provides means for locating and evaluating a plurality of different types of defects when the tubular member or pipe is in the normal operating position in a well or in a pipe rack. The invention includes a combination of a novel eddy current inspection device which searches primarily for longitudinal and structural defects, a novel inspecting unit utilizing toroid shaped coils to search primarily for transverse defects, a pit detection inspection apparatus, and an inspection unit utilizing a rotating radioactive source having a stationary radiation detection means for detecting radiation scattered back from the wall of the pipe being tested to thereby measure wall thickness.

By having this plurality of test unit, it is now possible to properly evaluate the defects detected in a tubular member with much greater accuracy than heretofore has been possible. By inspecting for a plurality of different types of defects in one operation, much time is saved in performing the search operation. In addition, and as will be explained hereinafter, by utilizing a radioactive source inspection unit along with other inspection units, the amount of radioactive material necessary for successful testing can be reduced substantially, thereby reducing the amount of shielding required and increasing the safety of operation.

The prior art is replete with various eddy current devices which have been used for various detecting operations. However, as will be explained hereinafter, none have been as successful as the novel eddy current inspection unit of the present invention. Similarly, there have been a number of magnetic inspection devices attempting to search for certain defects, but none have been as successful as the present invention which utilizes toroid shaped coils in searching for transfer defects. The prior art shows the use of the radiation back scatter technique in testing various materials for thickness or variation in thickness. However, none of the prior art shows the novel arrangement of the present unit which includes a rotating source in combination with a stationary radiation detection means, which overcomes a number of problems, as will be explained hereinafter.

Moreover, the prior art shows no apparatus utilizing a plurality of inspection units as does the present invention wherein various types of defects of the character hereinbefore mentioned can be successfully tested and evaluated by the use of only one tool and in one operation.

It is therefore an object of this invention to provide a novel and improved tool for measuring wall thickness of the pipe being inspected.

Another objective of this invention is to provide a novel inspecting tool having a novel electrical circuit for measuring longitudinal and structural defects.

It is a further object of this invention to provide a novel and improved apparatus for detecting transverse defects in the pipe being inspected.

It is a still further object of this invention to provide a tool which measures both the thickness of the pipe of the wall being inspected and at the same time inspects for longitudinal defects and/or other anomalies such as changes in structure.

Yet another object of this invention is to provide a tool for measuring the thickness of the wall of the pipe and for simultaneously searching for transverse defects.

Still another object of this invention is to provide a tool for inspecting for both longitudinal and transverse defects in one operation.

Another object of this invention is to provide an improved inspecting tool having thickness measuring means and means for inspecting for longitudinal and transverse defects.

A still further objective of this invention is to provide an improved tool for measuring wall thickness, for inspecting for longitudinal and structural defects, for inspecting for transverse defects, for inspecting for pits, and for providing means for recording the results of these inspections on a chart in one operation so that they may be correctly evaluated.

Reference to the drawings will further explain the invention wherein:

FIG. 3 is a cross sectional view taken at line 3—3 of FIG. 2a.

FIG. 4 is a cross sectional view taken at line 4—4 of FIG. 2a.

Figure 1:
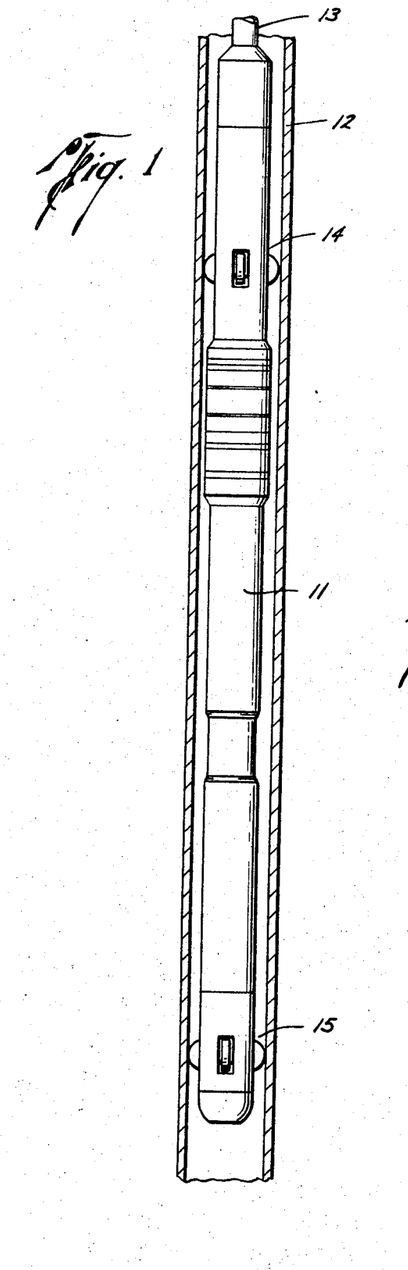
FIG. 1 is a side elevation view of the tool as it would appear being suspended in a well casing.

Generally speaking, the tool of this invention comprises an elongate housing for passing actually through a pipe. Referring to FIG. 1, there an elongate housing 11 is shown positioned inside of pipe 12. The upper part of the housing is supported by a cable (not shown) connected to connector 13. Housing 11 is provided with an upper centralizer assembly generally denoted by the numeral 14 and a lower centralizer assembly denoted by the numeral 15.

Figure 2A:
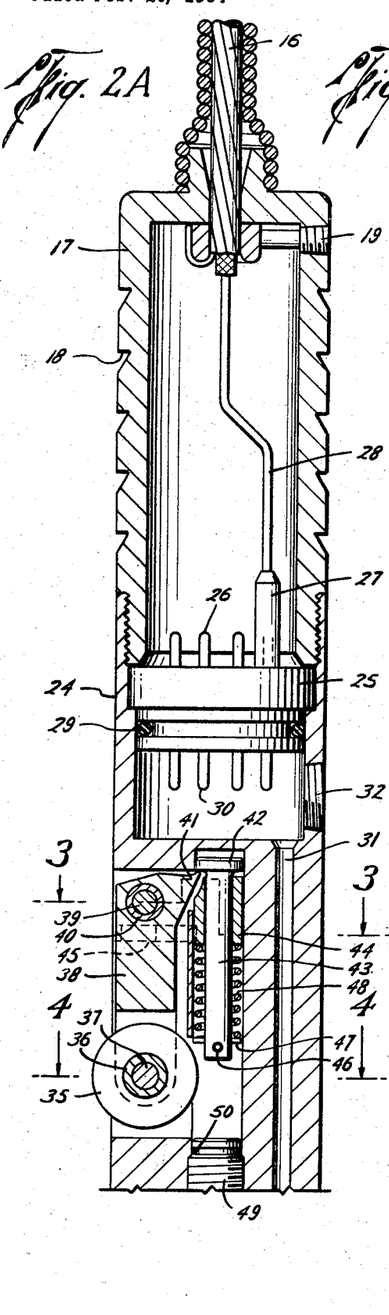
FIGS. 2a, 2b, 2c, and 2d are central vertical sectional views of the tool shown in FIG. 1.

Referring now to FIG. 2a, the details of the tool can be understood and explained in greater detail. Cable 16 is conveniently shown as one means for moving the tool axially and relatively through the pipe and is attached to fishing neck 17 which is tubular in shape and has a plurality of annular fishing recesses 18 thereabout for engaging a fishing tool in the event the tool should be dropped in a well. The upper end of fishing neck 17 is provided with access plug 19 which is for entry into the upper portion of the chamber inside of fishing neck 17. The lower portion of fishing neck 18 is threadably connetced to centralizer assembly tube 24. Just below the internal threads of centralizer tube 24, there is secured therein cable plug 25, having a plurality of pins 26 on the upper side which are adapted for securing the plurality of connectors 27 (only one of which is shown) which are connected to leads 28 (again only one of which is shown) which make up part of cable 16.

Figure 3:
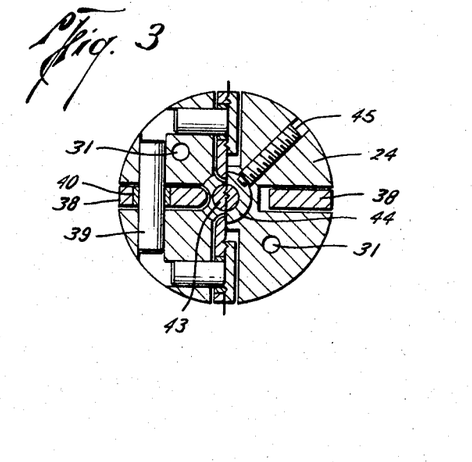
Figure 4:
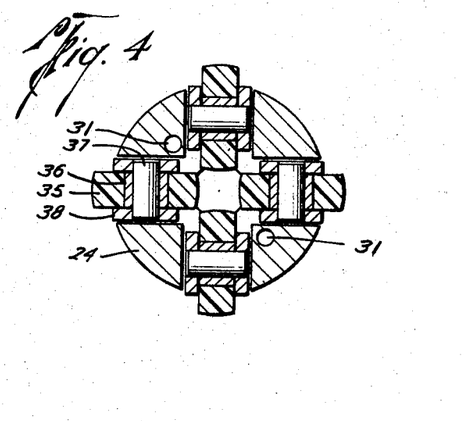

Plug 25 is provided with O-ring 29 which seals that portion of the tool thereabove. The bottom part of plug 25 is likewise provided with pin connectors 30 which are for the purpose of connecting wires or leads (not shown) leading to various inspection units through wire channel 31 which provides a longitudinal opening through tube 24 to the units therebelow. Reference to FIG. 3 will show that there may be two or more wire channels 31 provided through the tool. Centralizer assembly tube 24 is also provided with access plug 32 which permits entry to that portion of the tool.

The upper centralizer assembly is generally comprised of a plurality of nylon rollers 35 which are mounted on bushings 36 which are in turn mounted on pins 37 which are connected to centralizer arms 38. Arms 38 are mounted on pins 39 by bushings 40 for rotation radially outward and inward. The upper inside edge of each arm 38 is provided with an extension in the form of dog 41 which is designed to engage the lower edge of piston head 42 which piston head is attached to piston 43. The upper end of piston 43 is surrounded by piston sleeve 44 which sleeve is held in position by sleeve retaining screw 45. The lower end of piston 43 is provided with an opening through which pin 46 is positioned, which thereby secures washer 47 thereabove. Compression spring 48 is positioned in the annulus surrounding piston 43 and between washer 47 and sleeve 44. Thus, it will be observed that compression spring 48 generally urges piston 43 downward, thereby camming dog 41 downward and rotating arm 38 and roller 35 radially outward to engage the inside surface of the pipe being inspected. By having a plurality of these rollers, the upper portion of the tool is thereby centrally positioned in the pipe. Just below roller 35 and on the inside of the tool there is provided a centralizer plug 49 and O-ring 50 to seal off that portion of the tool therebelow. That in general describes the upper centralizer assembly.

Figure 2B:
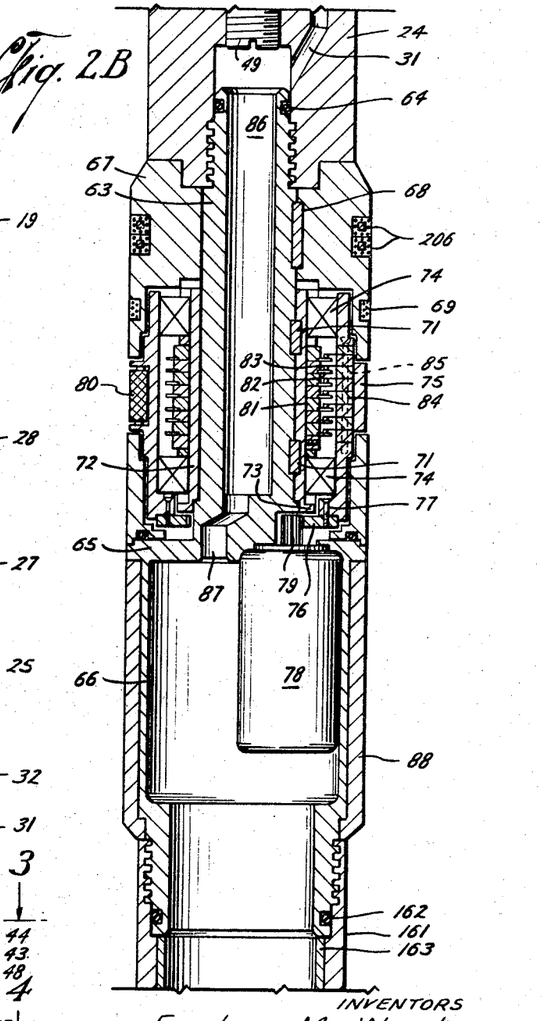
Figure 2C:
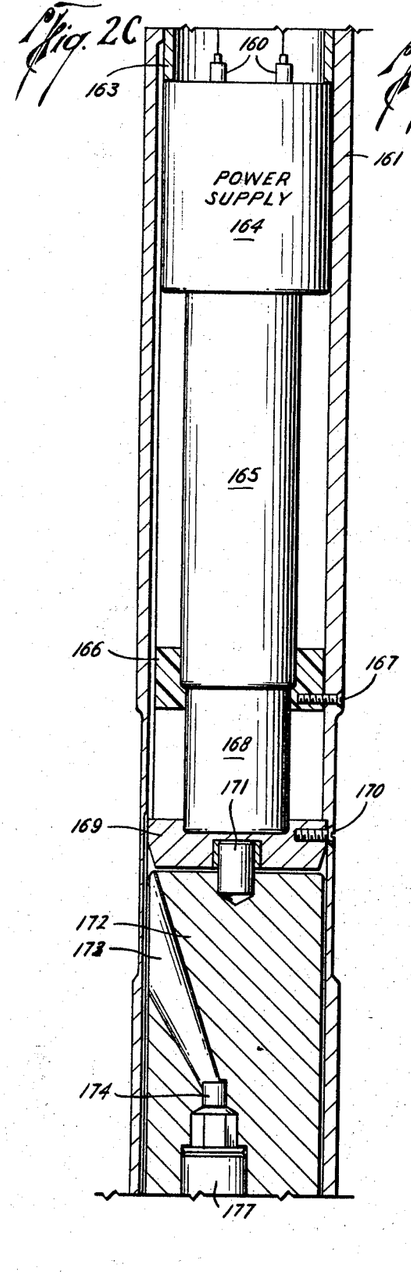
Figure 2D:
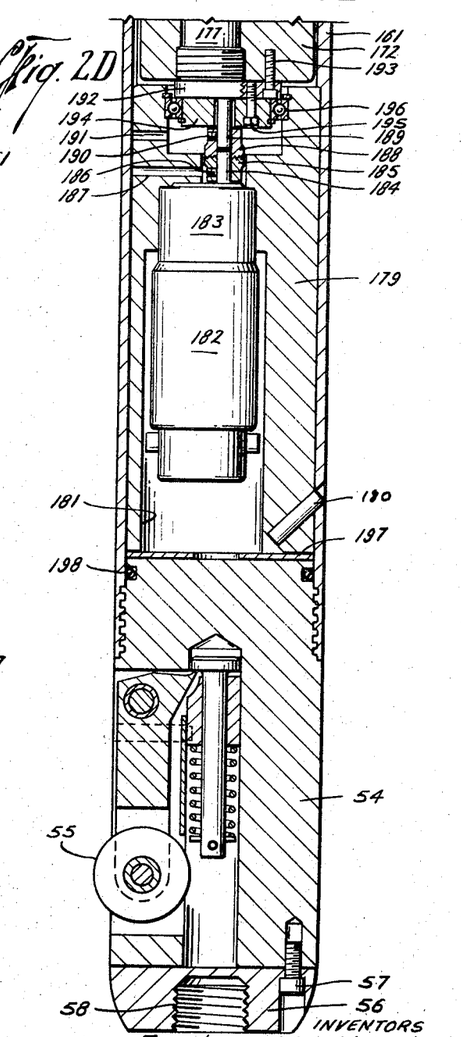

Referring now to FIG. 2d, the lower part of that figure shows the lower centralizer assembly which is shown as body 54, which body is threadably connected to the bottom-most part of the tool. Body 54 has a plurality of centralizing rollers 55 mounted on centralizing mechanisms similar to upper centralizing assembly previously described. The bottom portion of body 54 has attached thereto a cap 56 which is held in place by cap screws 57 extending upward and into the bottom part of body 54. Cap 56 is provided with a threaded annular opening 58 in the bottom thereof which may be utilized for attaching a sinker bar or the like. Alternatively, body 54 can be provided with additional wire channels so that other inspection tools may be attached therebelow. The foregoing generally describes the elongated housing which is designed for relative movement through the inside of a pipe.

The plurality of novel inspectioi units of which the tool is comprised will now be described in detail.

Eddy current inspection unit

The eddy current inspection device of the tool utilizes a plurality of rotating search coils mounted on a rotor such that the search coils spin in close proximity to the inside surface of the pipe being inspected. There is a stationary exciter coil spaced axially apart from the search coils and on which two signals of different frequency are impressed. Thus, two alternating currents of different frequencies are induced into the search coils. The search coils are so designed that they detect longitudinal surface defects, longitudinal internal defects, changes in metal structure, and the like. These different types of defects are then "read out" by the novel arrangement of the electronic circuit associated with this unit. The search coils are connected to the electronic circuit by rotatable coupling means in the form of slip rings and brush arrangements. The electronic circuit is so designed that a defect signal is indicated for the largest defect detected by any of the search coils.

The prior art is replete with examples of eddy current inspection devices, but none is as successful as the instant invention, and do not provide as definitive inspection as does the instant invention. In the present invention, the entire circumference of the wall is magnetized, but each search coil searches only a small portion of the wall.

Referring now to FIG. 2b, the mechanical portion of the eddy current unit will now be described in detail. Centralizer assembly tube 24 is provided with internal threads about annular opening in the bottom thereof into which fits tool core 63 which is made of aluminum or stainless steel or other nonmagnetic material. The top portion of tool core 63 is provided with O-ring 64 which provides the seal between the two elements. Tool core 63 extends downwardly from centralizer assembly tool 24 and has an enlarged portion 65 which forms a part of the outside body of the tool and also has a tubular portion 66 therebelow. Surrounding tool core 63 and abutting against the lower end of centralizer assembly tube 24 is coil mounting sleeve 67 which is held against rotation by key 68 which is embedded in tool core 63. Coil mounting sleeve 67 is annular in shape and is provided with an annular exciter coil 69 thereabout which coil is connected to an appropriate electrical power source (not shown).

Also keyed to tool core 63 by keys 71 is slip ring support sleeve 72 having an enlarged lower portion forming a flange 73 on the bottom end thereof. A pair of bearings 74 are mounted about support sleeves 72 and spaced apart and support rotor 75 for rotation thereabout. The lower end of rotor 75 is secured to ring gear 76 by screws 77.

Electric motor 78 is mounted inside of tubular portion 66 and has a drive shaft on which spur gear 79 is mounted for engaging ring gear 76. Hence, when electrical motor 78 is energized spur gear 79 turns ring gear 76 which rotates rotor 75.

Rotor 75 is provided with rotatable coupling means which connect the search coils mounted therein with appropriate leads to the control panel.

In the preferred embodiment and as will be explained hereinafter, search coils are mounted about the periphery of rotor 75 so that they may be spun in close proximity to the inside of the pipe. One such search coil is shown as search coil 80 mounted on rotor 75. There are a plurality of such search coils and each is connected to appropriate leads by the rotatable coupling means which will now be explained.

Positioned between bearings 74, and surrounding support sleeve 72, is an annular slip ring block 81 having a plurality of slip rings 82 attached thereto which are arranged to engage brushes 83 supported by brush block 84 which is mounted on rotor 75 by brush block screw 85. During rotation of rotor 75, search coils 80 are connected to brushes 83 which contact slip rings 82 which are connected to appropriate leads (not shown).

Tool core 63 is provided with central aperture 86 which communicates at its upper end with wire channel 31, and at its lower end it is provided with wire channel 87 which provides communication to portions of the tool therebelow.

Tubular portion 66 is also surrounded by spacing sleeve 88 which generally completes the description of the mechanical portion of the eddy current inspection unit.

Figure 7:
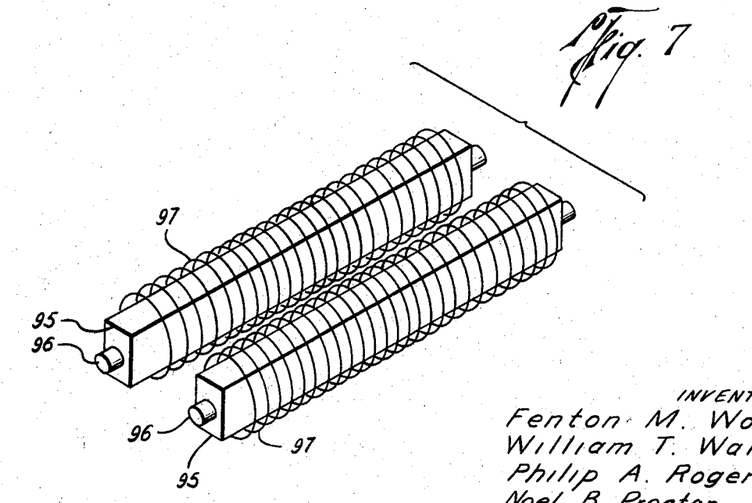
FIG. 7 is an isometric view of the search coils utilized in one embodiment of the eddy current unit of this invention.

Reference to FIG. 7 will show one embodiment of the search coils used in this eddy current unit. There is shown a pair of coils spaced side by side and connected in series by appropriate leads (not shown) and connected to leads (not shown) going to the control panel. Each search coil is comprised of an iron core 95 having mounting lugs 96 on each end thereof with wire windings 97 spirally wound thereabout. By having the search coils mounted in pairs in this fashion, they are much more sensitive than other prior art search coils in that they are able to detect longitudinal internal cracks, longitudinal surface cracks, and structural changes of the metal within the wall of the pipe.

These coils are mounted in pairs about the periphery of rotor 75 and are covered with a thin layer of plastic or other material to keep them from becoming fouled by debris on the surface of the pipe. Hence, they are held for spinning in close proximity to the inside surface of the pipe.

Figure 5:
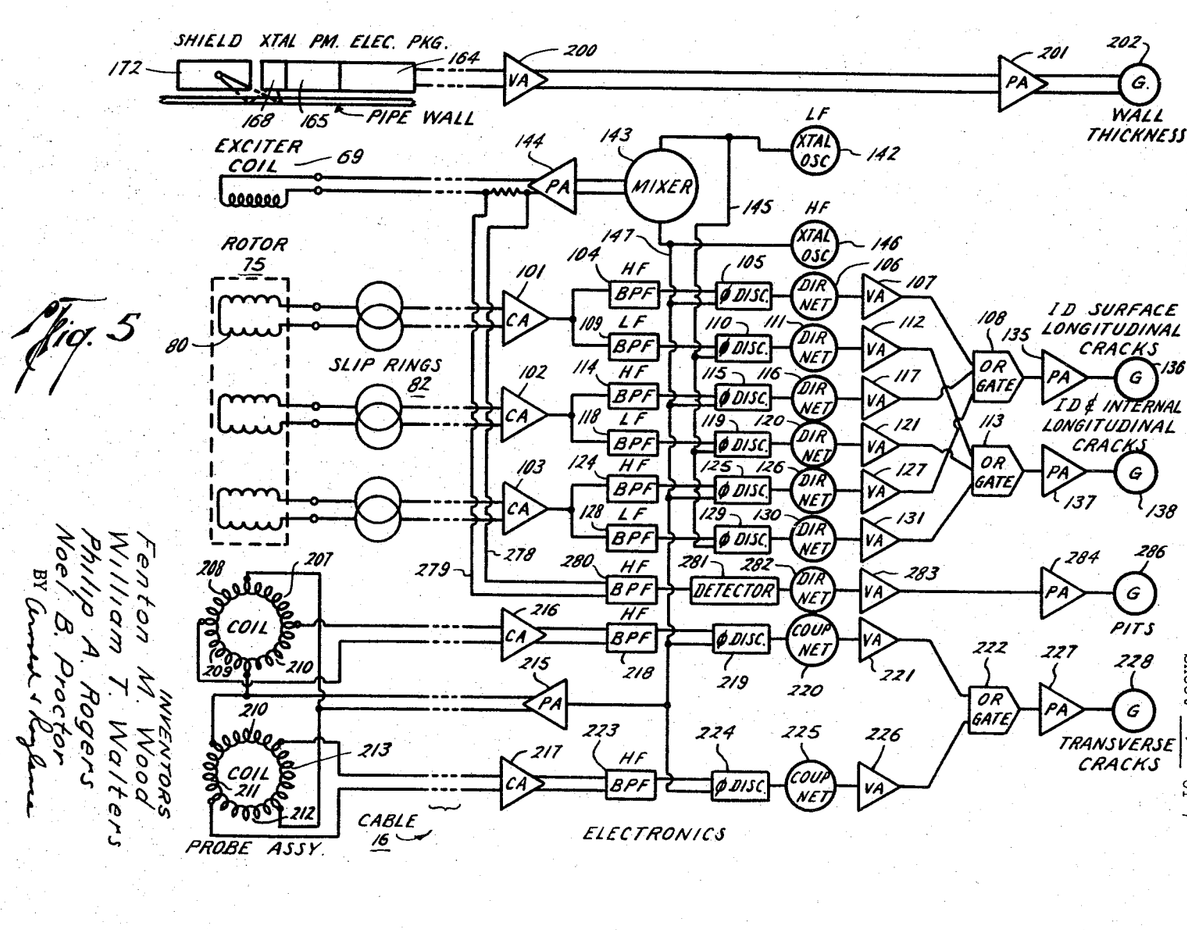
FIG. 5 is an electronic block diagram showing the electronic circuits of the various units of one embodiment of this invention.

Reference to FIG. 5 will show one embodiment of the electrical circuit of this eddy current unit. Rotor 75 has a plurality of pairs of search coils 80 connected in series and mounted thereabout, which coils are connected to slip rings 82, which are connected to appropriate leads going up through the tool and through the support cable 16.

Hence, coils 80 are coupled to carrier amplifiers 101, 102 and 103, each of which forms a part of a first electrical circuit.

Carrier amplifier 101 is connected to a first channel having high frequency band pass filter 104, which is connected to phase discriminator 105, which is connected to derivative network 106, which is connected to voltage amplifier 107, which is connected to OR gate 108.

Carrier amplifier 101 is also connected to a second channel having low frequency band pass filter 109, which is connected to phase discriminator 110, which is connected to derivative network 111, which is connected to voltage amplifier 112, which is connected to a second OR gate 113. Each of the other carrier amplifiers 102 and 103 are connected to first and second channels in the same manner that carrier amplifier 101 is connected to two channels. Hence, carrier amplifier 102 is connected to a first channel having high frequency band pass filter 114, phase discriminator 115, derivative network 116, voltage amplifier 117, which in turn is connected to OR gate 108. Carrier amplifier 102 is also connected to a second channel having low frequency band pass filter 118, phase discriminator 119, derivative network 120, voltage amplifier 121, which is connected to OR gate 113.

Similarly, carrier amplifier 103 has a first channel having high frequency band pass filter 124, phase discriminator 125, derivative network 126, voltage amplifier 127, which is connected to OR gate 108. Carrier amplifier 103 is also connected to a second channel having a low frequency band pass filter 128, phase discriminator 129, derivative network 130, and voltage amplifier 131 which is connected to OR gate 113.

OR gate 108 is connected to power amplifier 135 which is connected to galvanometer 136 which is arranged to record on a strip chart or the like. OR gate 113 is connected to power amplifier 137 which is connected to galvanometer 138 for recording on the same strip chart. For purposes of convenience, OR gate 108 will be referred to as the second electrical circuit which is connected to each of the first channels previously referred to and is responsive to the larger signal transmitted by the first channels. Similarly, for purpose of convenience, OR gate 113 will be referred to as the third electrical circuit and is connected to the second channels previously referred to and is responsive to the largest signal transmitted thereby.

It is to be understood that there may be a greater number of search coils utilized in the circuit than is here shown with each of them being connected in a similar manner.

The means for inducing at least two alternating currents of different frequencies in the search coils in the present embodiment takes the form of low frequency crystal oscillator 142, which is connected to mixer circuit 143, which is connected to power amplifier 144, which is connected with exciter coil 69 mounted in a stationary position in the tool as shown in FIG. 2b.

Oscillator 142 is also connected to lead 145 which supplies a signal to discriminators 110, 119 and 129, which discriminators form a part of the low frequency or second channels previously described. Another signal of different frequency is induced in search coils 80 by high frequency crystal oscillator 146, which is likewise connected to mixer 143, amplifier 144, and exciter coil 69. In addition, oscillator 146 is connected to lead 147 which in turn connects to phase discriminators 105, 115 and 125.

Oscillators 142 and 146 are selected to provide two sources of alternating currents of different frequencies which are impressed on exciter coil 69 and in the preferred embodiment, low frequency oscillator 142 would be operating in the range of about 1 kc. to 10 kc. whereas high frequency oscillator 146 would be operating in the range of about 10 kc. to 100 kc.

In operation, rotor 75 will be rotated while moving the tool through the pipe being inspected. Oscillators 142 and 146 will be applying two frequencies to exciter coil 69 which would establish a magnetic field in substantially the full circumference of the pipe being inspected. As search coils 80 are rotated, they will detect variations in the magnetic field which are occasioned by longitudinal defects (both surface and internal) and changes in structure in the pipe being inspected. The electrical voltages which are induced in search coils 80 by the magnetic field are applied to slip rings 82 and to the carrier amplifiers 101, 102 and 103. Since high frequency signals penetrate the pipe wall to a smaller degree than the low frequencies, the high frequency signals may be used to determine surface defects whereas the low frequency signals may be used to determine surface defects, internal defects and structural changes since the low frequency signals tend to penetrate the body of the pipe wall to a greater extent.

The voltages induced in search coils 80 are applied to carrier amplifiers 101, 102 and 103. High frequency band pass filters 104, 114 and 124 will pass the high frequency signals respectively to phase discriminators 105, 115 and 125 which discriminators compare the initial phase angle of the voltage applied by high frequency crystal oscillator 146 with the phase angle of the voltage picked up by the search coils. If there is a change in phase angle above a predetermined level, then there will be an output to derivative networks 106, 116 and 126, respectively, all of which are connected to OR gate 108. Hence, the largest signal applied to OR gate 108 will control the output thereof. Since defects affect the phase angle of the high frequency signal, such defects will be detected and recorded by galvanometer 136.

Similarly, any distortions in the low frequency signal caused by defects in the pipe wall will operate galvanometer 138 to record longitudinal surface and internal cracks and structural changes. The foregoing generally describes one embodiment of the electrical circuits of this eddy current device.

Figure 6:
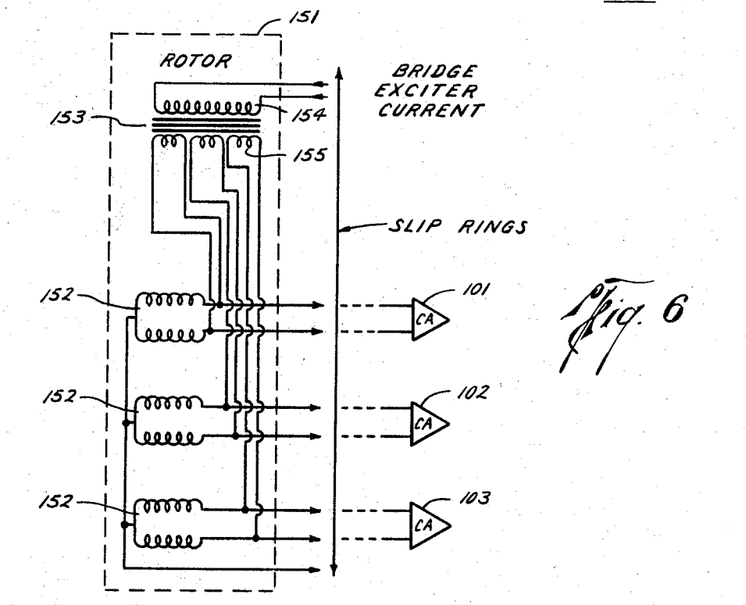
FIG. 6 is an electrical block diagram showing one alternative embodiment of a portion of the eddy current detection unit of this apparatus.

Reference to FIG. 6 will show an alternative embodiment of the means for inducing at least two alternating currents of different frequencies in the search coils. In this embodiment rotor 151 is the same as rotor 75 shown in FIG. 2b and pairs of coils 152 are the same as coils 80 shown in FIG. 5. However, in this instance the means for inducing at least two alternating currents of different frequencies in the search coils takes a different form. Rather than having an outside exciter coil, rotor 151 is provided with transformer 153 having a primary winding 154 which is connected through slip rings to two sources of alternating currents in the same manner as shown in FIG. 5. In addition, transformer 153 has a plurality of secondary windings 155, each of which is connected to the input and output of one of the pairs of search coils 152. In other respects, this embodiment of the electrical circuit is similar to the same shown in FIG. 5 and previously described. The two frequencies are impressed on primary winding 154 which induces corresponding signals in secondary windings 155 which signals are then induced in coils 152. The operation of coils 152 is the same and any defects detected by coils 152 would similarly change the respective phase angles of the two different signals, which differences will be detected by the detection network described with respect to FIG. 5. This arrangement eliminates the need for an exciter coil as taught in the first embodiment. The foregoing generally describes certain embodiments of the eddy current inspection unit of this invention and the advantages thereof.

*Radioactive pipe wall thickness measuring unit*

Another inspecting unit which makes up a portion of the present invention is a wall thickness measuring unit which utilizes a radioactive source mounted in a rotatable shield, with the shield having an aperture therethrough and extending outwardly from the source for projecting a beam of rays at an angle into the wall of the pipe. Radiation detection means are mounted axially apart from the shield and in a stationary position within the housing and responsive to radiation scattered back from the wall of said pipe to produce electrical signals which vary according to the intensity of the scattered radiation. Means are also provided for indicating the output of the radiation detection means.

By projecting a beam of radioactive rays, such as gamma rays, against the pipe wall, there will be a certain amount of back scatter therefrom. The greater the thickness of the wall, the greater will be the amount of radiation scattered back. Hence, by measuring the radiation scattered back, an indication is received of the thickness and, hence, the degree of wear on the pipe.

The prior art has many examples of apparatuses using gamma rays and/or beta rays or the like, wherein the back scatter technique is used. However, all of the prior art devices suffer certain defects which the present radioactive unit overcome. For example, in the present invention a rotating shield and source is used together with a stationary radiation detection means which is mounted axially apart from the shield. No slip rings are required in transmitting the information collected by the radiation detection means to the recording panel. Since the information transmitted by the radiation detection means is generally of high voltage and low current, the elimination of slip rings is a decided advantage for the reason that it is easier to insulate the apparatus against moisture, particularly where the tool is being operated down well and also because there is no slip ring noise, which noise is generally in the same frequency range as the defect signals detected by the radiation detection means.

Moreover, the present invention utilizes a smaller radioactive source since the full circumference of the pipe is not being radiated, but only a small portion thereof in a helical fashion. This permits a reduction in the amount of shielding required and lowers the radiation danger to the operators.

Referring to the bottom part of FIG. 2b, it will be seen that external tube 161, preferably of aluminum, is attached to the lower end of tubular portion 66 with O-ring 162 therebetween. Positioned inside of external tube 161 is spacer sleeve 163.

Referring now to FIG. 2c, the details of the wall thickness measuring unit will now be described in greater detail. Positioned inside of external tube 161 and against the lower end of spacer sleeve 163 is power supply 164, which supplies a DC power to a high voltage photo-multiplier and also contains both amplifier and interpreter circuits as is standard in radioactive search units of this general type. Power supply 164 is connected by connectors 160 on the top thereof to leads connecting to the control panel. Positioned immediately below power supply 164 is photo-multiplier tube 165, the bottom end of which is supported by annular nylon support 166 which is held in place by set screw 167 passing through external tube 161. Immediately below photo-multiplier tube 165 and connected thereto is scintillation crystal 168, the bottom end of which is suported by tube bulkhead 169, which is of tungsten and which not only supports the scintillation crystal 168 but also supports that portion of the tool therebelow. Bulkhead 169 is held in position by set screw 170, also passing through external tube 161. Bulkhead 169 is made of tungsten so as to prevent stray radiation from adversely effecting scintillation crystal 168.

The bottom side of bulkhead 169 is provided with a central aperture into which rotor plug 171 is inserted for rotation therein. The bottom part of plug 171 is attached to a rotatable shield 172 which is generally in the shape of a cylinder and is of a high density material such as lead and is provided with aperture 173 therein. Positioned inside of shield 172 is a radioactive source capsule 174 containing a radioactive source.

Aperture 172 extends outwardly from capsule 174 to the outside surface of shield 172 in a cone shape. Aperture 173 is designed to project radiation from capsule 174 into the wall of the pipe being inspected at an angle so that any back scatter therefrom can be detected by scintillation crystal 168, thus, permitting the detection means to be spaced axially apart from the rotatable source and in a fixed position. To accomplish this, the central axis of the aperture extends outward at an angle of between about 20 and 80 degrees with respect to the longitudinal axis of the housing. Having the radiation detection means spaced axially apart from the source permits the mounting of the radiation detection in a fixed position in the housing, thus eliminating the need for slip rings and the like. The cross-sectional area of aperture 172 is selected such that only a small area of the pipe is radiated at one time and preferably less than one-half of the circumference of the pipe at one time.

It is to be understood that radiation detection means other than a scintillation crystal could be used, as for example, an ionization chamber could be utilized. Further, other high density metals may be used in the shield, such as tungsten, in addition to lead which was previously discussed. The bottom portion of shield 172 is provided with an axial opening through which capsule 174 is inserted and in which shield plug 177 is threadably engaged. Plug 177 is likewise of lead or other high density metal to properly shield the radioactive source.

Referring to FIG. 2d, the lower portion of external tube 161 is provided with a motor mounting 179 therein which is cylindrical in shape and fits inside of external tube 161 and is held from rotation by torsion plug 180 which engages the side of external tube 161. Motor recess 181 is provided in motor housing 179 and is adapted for accommodation of electric motor 182 which is mounted and arranged to drive the gears contained in gear box 183 and to turn drive shaft 184. Surrounding drive shaft 184 is a sleeve 185 which is held by set screw 186, access to which is via access hole 187 in motor mounting 179. The upper edge of sleeve 185 is provided with notches which match with another sleeve 188 which is secured to shield shaft 189 by another set screw 190, access to which is reached through access hole 191 in motor housing 179.

Shield shaft 189 is connected to shield drive flange 192 which is bolted to shield 172 by bolts 193. Shield shaft 189 is also supported by inner race support 194 which is bolted to shield drive flange 192 by bolts 195. Inner race support 194 is part of bearing 196 which is mounted in the upper end of motor mounting 179. In operation, motor 182 turns drive shaft 184, which turns sleeve 185, which engages sleeve 188 and turns shield shaft 189, hence rotating shield 172 at the desired speed.

The bottom portion of motor mounting 179 is supported by nylon washer 197 which is held in position by the upper part of lower centralizer assembly body 54, the upper end of which has O-ring 198 mounted thereabout to provide a seal therebetween. The foregoing generally describes the mechanical portion of the wall thickness measuring inspection unit of this invention.

Referring now to FIG. 5, it will be seen that the electrical circuit is coordinated with the other inspecting units. Namely the camera or shield 172 is shown adjacent to the pipe wall and projecting a beam of rays into the wall, with some rays being reflected back into scintillation crystal 168, which in turn is connected to photo-multiplier tube 165, which is connected to electronic package including power supply 164, which is connected to voltage amplifier 200 which is connected to power amplifier 201, which is connected to galvanometer 202, the stylus of which is positioned so as to record on a strip chart or the like and at the same time in a perpendicular manner with respect to galvanometers 136 and 138 previously described. The foregoing generally describes one embodiment of the construction and operation of the wall thickness measuring unit. It is to be understood that various radioactive sources can be used, but a gamma ray source is a satisfactory and preferred one.

Thus, it will be observed that the art has been provided with a highly successful and novel wall thickness measuring device which is adapted for passage through a pipe. It has no slip rings and utilizes a smaller radiation source than most of the prior art apparatuses.

*Transverse defect searching unit*

Another inspecting unit which makes up a part of this invention is a unit which searches for transverse defects in pipes or the like. Heretofore, there has been no satisfactory method of testing pipes from the inside for transverse defects, which defects are typical of defects arising out of use of the pipe.

Referring now to FIG. 5, it will be seen that there are a pair of toroid shaped coils, each member of the pair being formed of four coils connected together to form a circle. Hence, one toroid coil is formed by coils tool 207, 208, 209 and 210, all of which may be wound around a donut shaped bar. The other member of the pair of toroid shaped coils is formed by coils 211, 212, 213 and 214. The input to these coils is from high frequency oscillator 146 via lead 147 to power amplifier 215 which supplies a high frequency signal to the coils. The output of one of the toroid coils is to carrier amplifier 216 and the output of the other one of the toroid shaped coils is to carrier amplifier 217. Carrier amplifier 216 forms part of a channel which includes high frequency band pass filter 218, phase discriminator 219, coupling network 220, and voltage amplifier 221, which is connected to OR gate 222.

Carrier amplifier 217 forms part of another channel which includes high frequency band pass filter 223, phase discriminator 224, coupling network 225 and voltage amplifier 226, which is likewise connected to OR gate 222. OR gate 222 is connected to power amplifier 227, which is connected to operate galvanometer 228.

It is to be understood that only one toroid shaped coil could be used in some instances but that a pair of toroid coils is preferred because of the simplicity of the balance bridge circuits heretofore described, which circuit will be referred to as the electrical detection circuit. The high frequency test signal which is applied by oscillator 146 is selected for optimum resolution depending upon the nature of the transverse defects for which detection is sought.

Referring now to FIG. 2b, the pair of toroid shaped coils previously referred to are mounted in the tool housing and are shown as coils 206 and positioned in annular recesses around coil mounting sleeve 67 and are covered by a plastic coating or the like to keep them clear of debris.

In operation, the pair of toroid coils 206 will be passed axially through a pipe with the test signal being applied thereto by power amplifier 215 shown in FIG. 5. If a transverse defect is encountered by either of the pair of toroid coils, the bridge will become unbalanced and hence, there will be an output through that channel which is connected to the coil that detected the transverse defect. When this occurs, there will be an output from OR gate 222 to power amplifier 227 to operate galvanometer 228. Again it should be pointed out that the stylus of galvanometer 228 is selected and so arranged as to transcribe in a perpendicular line with galvanometers 202, 136 and 138 and preferably on the same chart. It is to be understood that the toroid shaped coils 206 are positioned in the tool so that the central axis thereof will be generally coincident with the central axis of the pipe being inspected. Since OR gate 222 is responsive to the largest signal received, there will be an output therefrom any time that one of the coils detects a pit. Hence, it is possible to detect transverse pits by the use of these toroid shaped coils.

The prior art has been largely concerned with detecting longitudinal flaws. The present invention, which utilizes toroid shaped coils, permits inspecting for transverse defects which occur as a result of use of the pipe. Hence, this invention provides a means for testing used pipe which has not heretofore been available nor as accurate and definitive as the instant invention.

Figure 8:
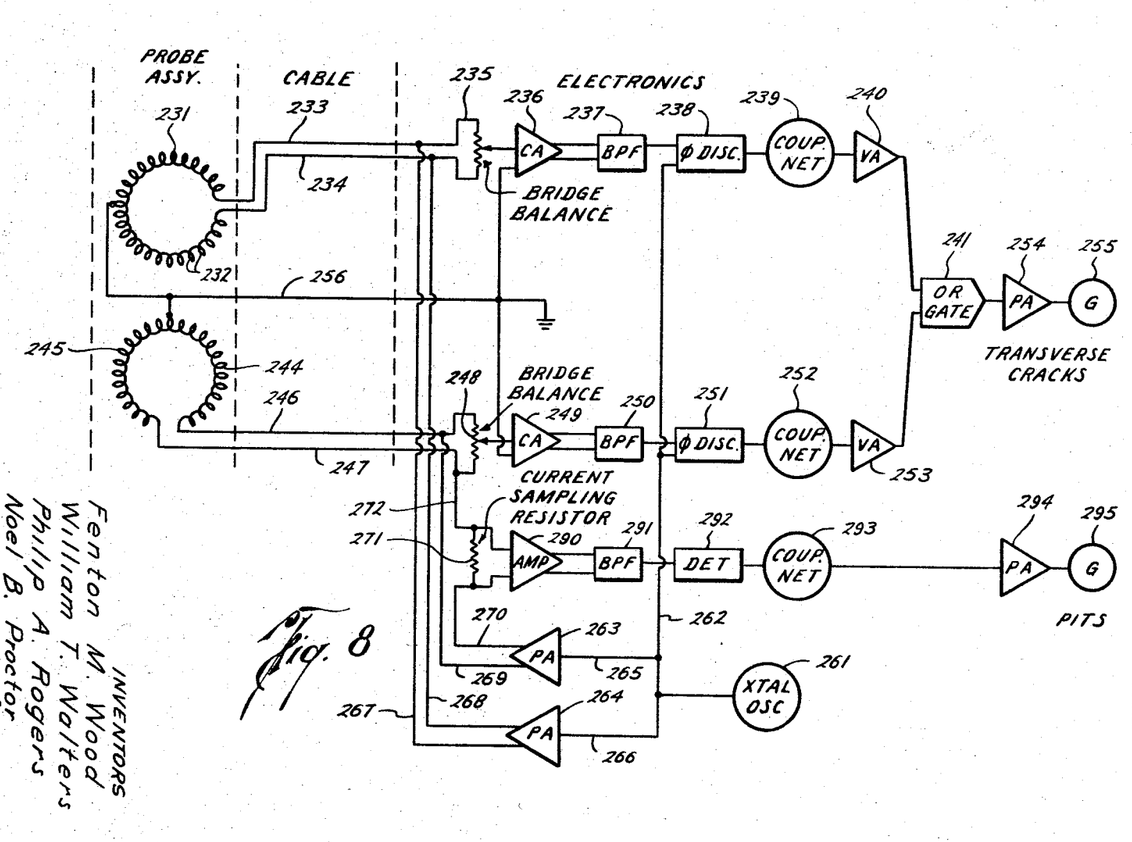
FIG. 8 is a block diagram of another alternative arrangement of the circuit and coils of the unit which searches for the transverse defects and another alternative arrangement of the pit detection circuit.

Referring now to FIG. 8, an alternative arrangement, the transverse defect sensing unit will be explained in detail. FIG. 8 shows a pair of toriod coils, one member of which is formed by coils 231 and 232 which are connected by leads 233 and 234 through variable resistors 235 to carrier amplifier 236 to band pass filter 237, phase discriminator 238, coupling network 239 and voltage power amplifier 240, which is connected to OR gate 241.

Another one of the toroid shaped coils is formed by coils 244 and 245 and are connected via leads 246 and 247 through variable resistor 248 through carrier amplifier 249, band pass filter 250, phase discriminator 251, coupling network 252, and voltage amplifier 253, which is also connected to OR gate 241. OR gate 241 is connected to power amplifier 254 which is connected to galvanometer 255. Both members of the pair of toroid shaped coils is connected to appropriate ground by lead 256.

Means for applying an electrical test signal to the toroid shaped coils takes the form of oscillator 261, which is connected to phase discriminators 238 and 251 by lead 262 and to power amplifiers 263 and 264 via leads 265 and 266.

Power amplifier 264 is connected to leads 267 and 268 which, respectively, are connected to leads 233 and 234 which apply the test signal to coils 231 and 232. Power amplifier 263 is connected to lead 269 which in turn connects with lead 246 to apply the test signal to coil 244. Power amplifier 263 is also connected to lead 270 which in turn is connected to resistor 271 which is a current sampling resistor, the purpose of which will be explained hereinafter. Resistor 271 is connected to lead 247 via lead 272.

In operation, oscillator 261 will apply a test signal to the toroid coils formed by coils 231 and 232 and by coils 244 and 245. During normal operation when no transverse defects are being encountered, resistors 235 and 248 will be so adjusted as to be in balance. If either of the toroid shaped coils should encounter a defect, there will be an output over one of the channels to phase discriminator 238 or 251 to OR gate 241, which will then cause an output to amplifier 254, which will drive galvanometer 255 in the same manner that galvanometer 228 is driven in respect to FIG. 5. It will be noted that the toroid coils formed by coils 231 and 232 and 244 and 245 are turned 90° with respect to each other so that there will be overlapping of the area searched by the respective coil.

The foregoing generally describes the novel inspection unit used for detecting transverse defects.

Pit detector unit

In addition to the foregoing units, another unit has been utilized in the present tool to provide more detailed information concerning the condition of the pipe and more particularly to inspect for pits which are on the inside of the pipe and which are not readily detected by the foregoing inspection units. The great advantage of having a pit detector in combination with certain of the foregoing inspection units is to permit the operator to determine with greater accuracy the type of defect encountered, which has not always been possible with prior art inspection devices.

Referring now to FIG. 5, it will be observed that a current sampling resistor 276 has been placed immediately following power amplifier 144, which resistor is connected by leads 278 and 279 to high frequency band pass filter 280, to detector 281, to derivative network 282, to voltage amplifier 283, to power amplifier 284, which is connected to drive galvanometer 286, the stylus of which is arranged to record in a position which is perpendicular with the recording stylus of galvanometers 202, 136, 138 and 228.

In operation, if exciter coil 269 passes over a pit, there will be reduced resistance to current in coil 69 with the result that the current passing through resistor 276 will be increased, thereby applying a signal to filter 280 and detector 281, which detector is of standard type for detecting increased current. An output from detector 281 operates galvanometer 286. A prior art patent showing the electronic circuit for such a detector is U.S. Patent No. 2,337,231.

FIG. 8 also has a pit detector unit as a part thereof. In this instance, amplifier 290 is connected to variable resistor 271 and for transmitting a signal to band pass filter 291, which in turn is connected to detector 292, coupling network 293, power amplifier 294, which drives galvanometer 295. If coils 244 and 245 should pass over a pit, there will be decreased resistance therein resulting in an increased current through resistor 271, which then applies a signal to amplifier 290, to filter 291 to detector 292 to operate galvanometer 295. This is a somewhat different arrangement for the pit detector, but again, it is effective in detecting for pits, and, when used in combination with the other inspection units hereof, provides much more information than has heretofore been possible concerning the types of defects encountered in pipes.

The foregoing generally describes the unit for detecting pits in pipes, but is particularly useful when used in combination with the other units as explained above.

Plurality of the search units in combination

The tool of this invention also provides the art with an apparatus for inspecting for a plurality of different types of defects. In accomplishing this, a plurality of the search units have been combined in certain manners to accomplish detailed inspection that was heretofore not possible with prior art apparatuses. By having the styli of all the various galvanometers of the various inspection vertically aligned so that they record simultaneously on a strip chart, an operator can conveniently and accurately evaluate the nature of the defects detected.

Furthermore, it is possible to accomplish certain inspection operation by certain combinations herein which was not possible prior to the instant invention.

The advantages of operating two or more inspection units simultaneously can be appreciated by considering some of the problems encountered in tubular goods inspection. Inspection time is always a principal economic problem for field inspection services. By utilizing the rotating gamma ray back scatter device or the device above referred to as wall thickness measuring device, scans along a helical path down the pipe can be made. This helical scanning path enables the operator to scan more length of pipe per unit time than if 100% coverage of the wall were attempted with the thickness measuring unit.

The thickness measuring unit is quite accurate, giving pipe wall thickness within plus or minus 1% of the actual wall thickness. While the wall is being scanned by the wall thickness measuring unit, it is simultaneously inspected by the eddy current device which can scan continuously over 360° of the pipe but to a perhaps less accurate degree. During the scanning of a pipe, if the wall thickness measuring device misses a particular thin wall or section, the eddy current will detect the thin section. This allows the operator to retrace that portion of the pipe and to run the wall thickness measuring unit over that portion of the pipe detected by the eddy current unit and hence obtain a more accurate measurement. Thus, commercial operating speed is maintained without adversely affecting accuracy. A substantial reduction of the size of the radioactive source is possible, which increases the safety of operating the unit. Moreover, pronounced changes in metallurgical structure due to overheating of the pipe in use can be detected and evaluated by comparing the logs of the radioactive unit and the eddy current unit. This is important when it is realized that it is impractical to determine or separate all types of defects using eddy current techniques alone. By using two or more techniques, an operator can discriminate between wall thickness reduction and structure changes.

Figure 9:
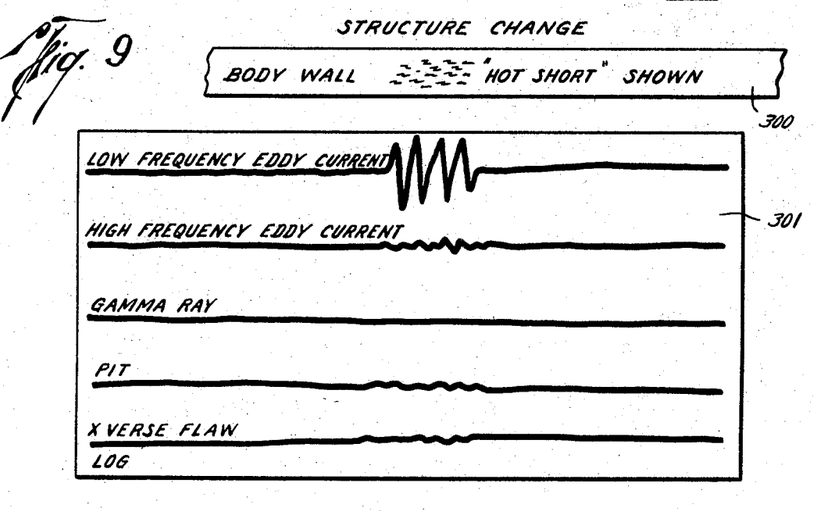
FIG. 9 is a portion of a strip chart showing the recordings made as a result of the defect detected by the several different inspection units showing a typical and representative response for a particular defect.

Reference to FIG. 9 will show how these defects can be recorded on chart 301. Pipe body wall 300 has a structural change therein in the form of hot shot, which is a kind of defect well known to those skilled in the art. The top chart indicated as "low frequency eddy current" will be made by galvanometer 138 of FIG. 5. Since low frequency eddy currents tend to penetrate the body wall, the structural changes are detected thereby. The second chart labeled "high frequency eddy current" will be made by galvanometer 136 of FIG. 5. Since high frequency eddy currents penetrate to a less extent than low frequency eddy currents, only a slight defect is recorded on this chart as a result of the hot shot.

The third chart is labeled "gamma ray" and is the chart produced by galvanometer 202 in FIG. 5. Since the radioactive gamma ray unit measures wall thickness, there would be no recording of a hot shot defect. The next chart labeled "pits" is recorded by galvanometer 286 of FIG. 5. The hot shot defect has little effect on the pit decesting unit, and hence the chart shows only a minor reaction. The next chart labeled "transverse flaw" is made by galvanometer 228 of FIG. 5 and it too is effected very little by a hot shot. By comparing these five charts, the operator can readily discern by observation the type of defect encountered.

Figure 10:
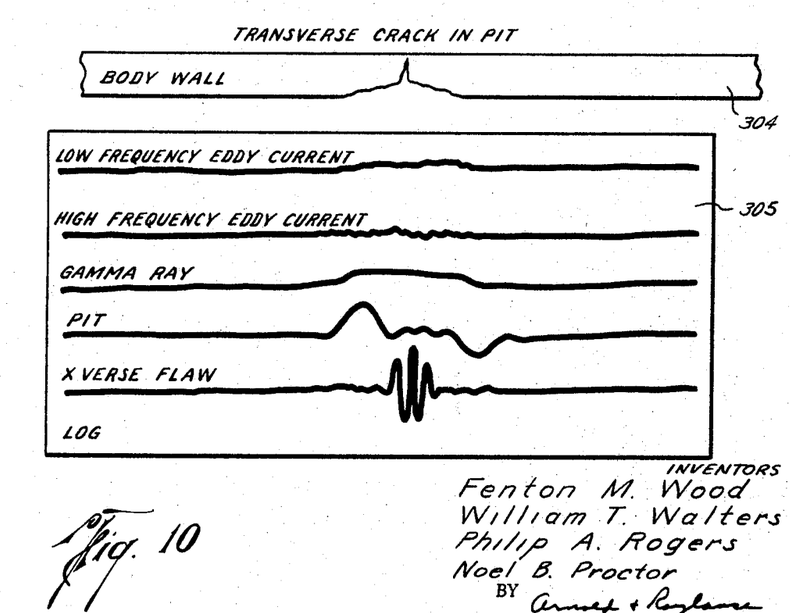
FIG. 10 is a view similar to FIG. 9 and shows typical responses to another type of defect.

Referring now to FIG. 10, another type of defect is shown in body wall 304 as it would be recorded on strip chart 305. In this instance wall 305 is shown with a pit having a transverse crack therein. The first two lines on chart 305, respectively labeled "low frequency eddy current" and "high frequency eddy current" are made by galvanometers 138 and 136 of FIG. 5 and show little reaction to this type defect.

However, the gamma ray chart which would be made by galvanometer 202 of FIG. 5 shows a substantial reduction of wall thickness. Likewise, the pits line, which would be made by galvanometer 286, shows a substantial defect, as does the transverse flaw line made by galvanometer 228 of FIG. 5. Hence, the operator can readily determine that there is a pit, that there is a transverse crack in that pit, and that there is a substantial reduction in wall thickness.

The foregoing examples of the strip charts made by the apparatus of this invention are merely illustrative of the many different types of defects which can be detected and evaluated. In certain instances, two of the units may be combined in one tool for satisfactory results. For example, in one embodiment the wall thickness measuring unit could be utilized in combination with the eddy current device with attendant advantages discussed above. In another tool, the wall thickness measuring unit could be combined with the unit measuring for transverse defect. Since the prior art teaches no unit utilizing toroid shaped coils whereby searches can be made for transverse defects, this combination provides the art with a tool which is a considerable improvement over the prior art. Similarly, there could be a combination of the eddy current inspection unit with the transverse defect inspecting unit to provide a type of inspection that has not heretofore been possible. Moreover, combinations of three or four of the foregoing types of units could be made for a very definitive type inspection such as that shown by FIGS. 9 and 10.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. An apparatus for passing axially through the inside of a pipe and for detecting variations in the wall thickness of the pipe comprising:
   an elongate housing for passing through said pipe,
   means for effecting relative movement of said housing in an axial direction through said pipe,
   a shield mounted in said housing for rotation about the longitudinal axis thereof, and having
   a radioactive source mounted therein and
   said shield having an aperture therethrough and extending outwardly from said source for projecting a beam of rays from said source into said wall of said pipe,
   means for rotating said shield,
   radiation detection means mounted axially apart from said shield and in omnidirectionally a stationary position within said housing and responsive to radiation scattered from the wall of said pipe to produce electrical signals which vary according to the intensity of said scattered radiation, and
   means for indicating the output of said radiation detection means.

2. The apparatus as claimed in claim 1 including:
   means for resiliently centralizing said housing in said pipe during said relative movement, and wherein said shield is of a high density metal.

3. The apparatus as claimed in claim 1, wherein:
   said radioactive source is a gamma ray source.

4. The apparatus as claimed in claim 1 wherein:
   the central axis of said aperture extends outwardly from said source at an angle between about 20° and 80° with respect to the longitudinal axis of said housing.

5. The apparatus as claimed in claim 1 wherein:
   said aperture has a cross-sectional area of a size to irradiate less than one-half of the circumference of said pipe at one time.

6. The apparatus as claimed in claim 1 wherein:
   said means for detecting radiation includes scintillation means and a photomultiplier responsive to scintillations from said scintillation means.

7. The apparatus as claimed in claim 1 wherein:
   said means for detecting radiation includes an ionization chamber responsive to said scattered radiation.

8. An apparatus for passing axially through the inside of a pipe and for testing the wall thickness of the pipe, comprising:
   an elongate housing for passing axially through said pipe,
   means for effecting relative movement of said housing through said pipe,
   a shield of high density metal mounted in said housing for rotation about the longitudinal axis thereof, and having
   a radioactive source mounted therein, and
   said shield having an aperture therethrough and extending outwardly from said source with the central axis thereof at an angle between about 20° and 80° with respect to the longitudinal axis of said housing, for projecting a beam of rays from said source into said wall of said pipe,
   means for rotating said shield relative to said housing,
   radiation detection means mounted axially apart from said shield and in omnidirectionally a stationary position within said housing and responsive to radiation scatteered from the wall of said pipe to thereby produce electrical signals which vary according to the intensity of said sattered radiation, and
   means for indicating the output of said radiation detection means.

9. An eddy current apparatus for magnetically testing pipe from the inside for a plurality of different types of defects, comprising:
   a housing for passing axially through said pipe,
   means for effecting relative movement of said housing through said pipe,
   a rotor mounted in said housing for rotation therein,
   a plurality of encirling-type search coils mounted about the periphery of said rotor,
   rotatable coupling means connected to each of said search coils,
   a plurality of first electrical circuits, one of which is connected to each of said coupling means and each of said first electrical circuits having,
      amplifier means,
      a first channel having a high frequency pass filter means and a first phase discriminator means connected to said amplifier means, and
      a second channel having a low frequency pass filter means and a second phase discrimination means connected to said amplifier means,
   a second electrical circuit connected to said first channels and responsive to the largest signal transmitted by said first channels, and
   a third electrical circuit connected to said second channels and responsive to the largest signal transmitted by said second channels,
   means for rotating said rotor relative to said housing, and
   means for inducing at least two alternating currents of different frequencies in said search coils,
   whereby defects detected by said coils vary the phase angle and amplitude of the signals induced by said alternating currents, which variations are detected by said phase discrimination means to produce defect signals indicative of the type of defect detected.

10. The apparatus as claimed in claim 9 wherein:
    said means for inducing said alternating currents of different frequencies in said search coils includes an exciter coil mounted in said housing and connected to at least two sources of alternating currents of different frequencies, for passing a magnetic field through the wall of said pipe.

11. The apparatus as claimed in claim 9 wherein:
    said means for inducing said alternating currents of different frequencies in said search coils includes a transformer mounted in said rotor and having
       a primary winding coupled with at least two sources of alternating currents of different frequencies, and
       a plurality of secondary windings each of which is connected to the input and output of one of said search coils.

12. The apparatus as claimed in claim 9 wherein:
    said second and third electrical circuits each include an electrical OR circuit.

13. The apparatus as claimed in claim 9 wherein:
said means for inducing at least two alternating currents of different frequencies includes two oscillators, one of which is operating within the frequency range of about 10 kc. to 100 kc. and one of which is operating within the frequency range of about 1 kc. to 10 kc.

14. The apparatus as claimed in claim 9 wherein:
said search coils are mounted in pairs and connected in series,
whereby said coils are rotated in close proximity to the internal surface of said pipe and are responsive to defects in the wall of said pipe.

15. An inspection apparatus for inspecting pipe from the inside for transverse defects comprising:
a housing shaped for passage through said pipe,
at least two spaced apart toroid shaped coils mounted in said housing with the central axis thereof generally coincident with the central axis of said pipe,
an electrical detection circuit connected to said coils and having amplifier means, filter means, phase discrimination means, and indicator means, and
means for applying a high frequency test signal to said coils and said phase discrimnation means.

16. The apparatus as claimed in claim 15 wherein:
said electrical detection circuit includes at least two channels, each channel having amplifier means, filter means, phase discrimination means, and wherein said channels are connected to a second electrical circuit having signal producing means responsive to the largest voltage transmitted by said channels.

17. An apparatus for passing axially through the inside of a pipe and for detecting a plurality of different types of defects comprising:
an elongate housing for passing through said pipe,
means for effecting relative movement of said housing through said pipe,
a first inspection unit mounted in said housing and comprising
 a radioactive source mounted in a shield,
 said shield being mounted for rotation in said housing and having an aperture therein extending outwardly from said source for projecting a beam of rays into the wall of said pipe,
 means for rotating said shield,
 radiation detection means mounted axially apart from said shield and in a stationary position within said housing and responsive to radiation scattered from the wall of said pipe to produce electrical signals which vary according to the intensity of said scattered radiation, and
 means for indicating the output of said radiation detection means, and
a second inspection unit mounted axially apart from said first inspection unit in said housing and comprising
 a rotor mounted for rotation on an axis generally concentric with the central axis of said pipe,
 a plurality of encircling-type search coils mounted about the periphery of said rotor,
 rotatable coupling means connected to each of said coils,
 an eddy current detection circuit connected to said coupling means and responsive to defects in said pipe,
 means for rotating said rotor, and
 indicator means connected to said eddy current detection circuit for indicating the output therefrom as defects in said pipe.

18. The apparatus as claimed in claim 9 including:
a fourth electrical circuit connected to said means for inducing at least two alternating currents of different frequencies,
means for detecting variations in the alternating currents generated in said search coils, and
indicator means connected to said detecting means for indicating said variations as pits in the pipe.

19. An apparatus for passing axially through the inside of a pipe for detecting a plurality of different types of defects, comprising
an elongate housing for passing through said pipe,
means for effecting relative movement of said housing through said pipe,
a first magnetic responsive inspection unit comprising
 a rotor mounted in said housing and having the axis thereof generally coincident with the longitudinal axis of said pipe,
 means for rotating said rotor,
 a plurality of encircling-type search coils mounted about the periphery of said rotor,
 rotatable coupling means connected to each of said search coils,
 an eddy current detection circuit connected to said coupling means and responsive to longitudinal defects in said pipe, and
 indicator means connected to said eddy current detection circuit for indicating the output therefrom as indications of longitudinal defects, and
transverse defect flaw detection means including
 at least one toroid shaped coil having its axis generally coincident with the pipe,
 a detection bridge circuit, including said toroid shaped coil as legs of said bridge circuit for producing electrical signals as an incident of transverse variations detected by said coil in said pipe, and
 indicating means connected to said detection bridge circuit for indicating transverse defects in the wall of said pipe.

20. An apparatus for passing axially through the inside of a pipe and for detecting a plurality of different types of defects in the wall of said pipe comprising:
an elongate housing for passing through said pipe,
means for effecting relative movement of said housing through said pipe,
a wall thickness measuring inspection unit comprising,
 a radioactive source mounted in a shield,
 said shield being mounted for rotation in said housing and having an aperture therein extending outwardly from said source for projecting a beam of rays into the wall of said pipe,
 means for rotating said shield,
 radiation detection means mounted axially apart from said shield and in a stationary position within said housing and omnidirectionally responsive to radiation scattered from said wall to produce electrical signals which vary according to the intensity of said scattered radiation, and
means for indicating the output of said radiation detection means as indication of variations in the thickness of said wall, and
a first magnetic responsive inspection unit comprising,
 a rotor mounted in said housing and having the axis thereof generally coincident with the longitudinal axis of said pipe,
 means for rotating said rotor,
 a plurality of encircling-type search coils mounted about the periphery of said rotor,
 rotatable coupling means connected to each of said search coils,
 an eddy current detection circuit connected to said coupling means and responsive to longitudinal defects in said pipe, and
 indicator means connected to said eddy current detection circuit for indicating the output therefrom as indications of longitudinal defects, and
transverse defect flaw detection means including
 at least one toroid shaped coil having its axis generally coincident with the pipe,
 a detection bridge circuit, including said toroid shaped coil as legs of said bridge circuit for producing electrical signals as an incident of transverse variations detected by said coil in said pipe, and indicating means connected to said detection bridge circuit for indicating transverse defects in the wall of said pipe.

21. The apparatus as claimed in claim 20, including pit detection means connected to said eddy current detection circuit and having means for detecting variations in the alternating currents generated in said eddy current circuit, and indicator means connected to said detecting means for indicating said variations as pits in the pipe.

22. Apparatus as claimed in claim 10 including:

current sampling means connected to said exciter coil, current flowing through said sampling means changing in the presence of pits in the pipe.

23. Apparatus as claimed in claim 19 including:

means for inducing an alternating current in said eddy current detection circuit, such that defects detected by said circuit varies the phase angle and amplitude of the signals induced by said alternating current, said means being connected to said detection bridge circuit and indicating a balanced condition in the absence of detected defects.

24. Apparatus as claimed in claim 20 including:

means for inducing an alternating current in said eddy current detection circuit, such that defects detected by said circuit vary the phase angle and amplitude of the signals induced by said alternating current, means being connected to said detection bridge circuit and indicating a balanced condition in the absence of detected defects.

25. An apparatus for passing axially through the inside of a pipe for detecting a plurality of different types of defects, comprising:

an elongate housing for passing through said pipe, means for effecting relative movement of said housing through said pipe, a wall thickness measuring inspection unit mounted in said housing and comprising a radioactive source mounted in a shield, said shield being mounted for rotation in said housing and having an aperture therein extending outwardly from said source for projecting a beam of rays into the wall of said pipe, means for rotating said shield, radiation detection means mounted axially apart from said shield and in a stationary position within said housing and omnidirectionally responsive to radiation scattered from said wall of said pipe to produce electrical signals which vary according to the intensity of said scattered radiation, and means for indicating the output of said radiation detection means as indications of variations in thickness of said wall, and transverse defect flaw detection means including at least two spaced apart toroid shaped coils mounted in said housing with the central axis thereof generally coincident with the central axis of said pipe, an electrical detection circuit connected to said coils and having amplifier means, filter means, phase discrimination means, and indicator means, and means for applying a high frequency test signal to said coils and said phase discrimination means.

References Cited

UNITED STATES PATENTS

| 2,277,756 | 3/1942 | Hare | 250—83.3 |
| 2,965,758 | 12/1960 | Malick | 250—83.3 |
| 3,056,920 | 10/1962 | Herrald | 324—37 |
| 3,066,254 | 11/1962 | Price et al. | 324—37 |
| 3,075,145 | 1/1963 | Goldberg et al. | 324—37 |
| 3,234,457 | 2/1966 | Sower et al. | 324—37 |

RALPH G. NILSON, *Primary Examiner.*

SAUL ELBAUM, *Assistant Examiner.*

U.S. Cl. X.R.

250—71.5; 324—37